(12) United States Patent
Behrens et al.

(10) Patent No.: US 10,017,032 B2
(45) Date of Patent: Jul. 10, 2018

(54) THERMAL MANAGEMENT SYSTEMS AND METHODS

(71) Applicant: THE BOEING COMPANY, Chicago, IL (US)

(72) Inventors: William Webster Behrens, St. Louis, MO (US); Andrew Richard Tucker, Glendale, MO (US)

(73) Assignee: The Boeing Company, Chicago, IL (US)

( * ) Notice: Subject to any disclaimer, the term of this patent is extended or adjusted under 35 U.S.C. 154(b) by 43 days.

(21) Appl. No.: 15/202,661

(22) Filed: Jul. 6, 2016

(65) Prior Publication Data

US 2017/0233083 A1   Aug. 17, 2017

Related U.S. Application Data

(63) Continuation-in-part of application No. 15/044,523, filed on Feb. 16, 2016.

(51) Int. Cl.
| | |
|---|---|
| *B60H 1/32* | (2006.01) |
| *B64C 1/00* | (2006.01) |
| *F02C 7/224* | (2006.01) |
| *B64D 37/34* | (2006.01) |
| *B64D 13/06* | (2006.01) |
| *F25B 7/00* | (2006.01) |

(Continued)

(52) U.S. Cl.
CPC .............. *B60H 1/323* (2013.01); *B64C 1/00* (2013.01); *B64D 13/06* (2013.01); *F02C 7/224* (2013.01); *B64D 13/00* (2013.01); *B64D 37/34* (2013.01); *B64D 2013/064* (2013.01); *B64D 2013/0614* (2013.01); *B64D 2013/0618* (2013.01); *B64D 2013/0644* (2013.01); *B64D 2013/0648* (2013.01); *B64D 2013/0674* (2013.01); *F25B 7/00* (2013.01); *F25B 9/06* (2013.01); *F25B 9/10* (2013.01); *F25B 11/02* (2013.01)

(58) Field of Classification Search
CPC ................... B64D 13/06; B64D 37/34; B64D 2013/0618; B64D 2013/064; B64D 2013/0648; F25B 7/00; F25B 11/02
USPC .......................................................... 62/87
See application file for complete search history.

(56) References Cited

U.S. PATENT DOCUMENTS 2,979,293 A * 4/1961 Mount ................. B64D 13/006
165/43
3,696,637 A * 10/1972 Ness .......................... F25B 9/06
62/402

(Continued)

FOREIGN PATENT DOCUMENTS

| CN | 1138685 | 12/1996 | |
|---|---|---|---|
| JP | WO 2014178240 A1 * | 11/2014 | ................ F25B 1/10 |

*Primary Examiner* — Len Tran
*Assistant Examiner* — Jenna M Hopkins
(74) *Attorney, Agent, or Firm* — Joseph M. Butscher; The Small Patent Law Group, LLC

(57) ABSTRACT

A thermal management system includes at least one vapor compression system (VCS) that is configured to cool portions of the vehicle. The VCS circulates a fluid therethrough to cool the portions of the vehicle through heat exchange. At least one reverse air cycle machine (RACM) couples to VCS through a first heat exchanger. The RACM is configured to receive ram air. The RACM expands the ram air. Heat from the fluid circulating through the VCS is transferred to the expanded ram air through the first heat exchanger.

19 Claims, 7 Drawing Sheets

(51) Int. Cl.
  *F25B 11/02* (2006.01)
  *B64D 13/00* (2006.01)
  *F25B 9/06* (2006.01)
  *F25B 9/10* (2006.01)

(56) References Cited

U.S. PATENT DOCUMENTS

| | | | | |
|---|---|---|---|---|
| 3,788,066 A * | 1/1974 | Nebgen | ............... | F01K 17/06 60/39.55 |
| 4,566,291 A * | 1/1986 | Halavais | ............... | F25B 9/02 62/402 |
| 5,918,472 A * | 7/1999 | Jonqueres | ............... | B64D 13/06 62/172 |
| 7,849,702 B2 | 12/2010 | Parikh | | |
| 8,863,544 B2 * | 10/2014 | Lee | ............... | H05K 7/207 62/259.2 |
| 8,967,528 B2 | 3/2015 | Mackin | | |
| 9,114,881 B2 | 8/2015 | Mar | | |
| 9,487,300 B2 * | 11/2016 | Klimpel | ............... | B64D 13/08 |
| 2003/0005718 A1 * | 1/2003 | Mitani | ............... | B64D 13/06 62/402 |
| 2003/0177781 A1 * | 9/2003 | Haas | ............... | B64D 13/06 62/402 |
| 2004/0155147 A1 * | 8/2004 | Munoz | ............... | B64D 13/06 244/118.5 |
| 2004/0194493 A1 * | 10/2004 | Army, Jr. | ............... | B64D 13/06 62/402 |
| 2008/0110193 A1 * | 5/2008 | Jonqueres | ............... | B64D 13/06 62/331 |
| 2008/0289335 A1 * | 11/2008 | Drysdale | ............... | F01D 15/005 60/649 |
| 2009/0232663 A1 * | 9/2009 | Mirsky | ............... | F01D 21/02 417/42 |
| 2010/0287934 A1 * | 11/2010 | Glynn | ............... | F01K 17/06 60/645 |
| 2012/0285184 A1 * | 11/2012 | Voinov | ............... | B64D 13/06 62/87 |
| 2014/0116084 A1 * | 5/2014 | Bonnissel | ............... | F25B 9/06 62/611 |
| 2015/0107261 A1 * | 4/2015 | Moes | ............... | B64D 13/06 60/783 |
| 2015/0166187 A1 * | 6/2015 | Durbin | ............... | B64D 13/08 62/79 |
| 2015/0251766 A1 * | 9/2015 | Atkey | ............... | B64D 13/08 244/13 |
| 2016/0047561 A1 * | 2/2016 | Army, Jr. | ............... | B23P 15/26 62/498 |
| 2016/0076793 A1 * | 3/2016 | Nakamura | ............... | F25B 1/10 62/402 |
| 2017/0057641 A1 * | 3/2017 | Koerner | ............... | B64D 13/06 |
| 2017/0159569 A1 * | 6/2017 | Miller | ............... | F02C 7/224 |

* cited by examiner

THERMAL MANAGEMENT SYSTEMS AND METHODS

RELATED APPLICATIONS

This application is a continuation-in-part of U.S. patent application Ser. No. 15/044,523, entitled "Thermal Management Systems and Methods," filed Feb. 16, 2016, which is hereby incorporated by reference in its entirety.

FIELD OF THE DISCLOSURE

Embodiments of the present disclosure generally relate to thermal management systems and methods, and, more particularly, to reverse air cycle machine thermal management systems and methods that are configured to efficiently condition portions of an aircraft, such as an internal cabin, electronic components, and the like.

BACKGROUND OF THE DISCLOSURE

Various aircraft draw air from turbine compression systems of one or more engines in order to maintain cabin pressure and to power auxiliary systems. The drawn air from the engine(s) is bleed air. In general, bleed air is compressed air that is drawn from a compressor stage of an engine, which is typically upstream from fuel-burning portions of the engine.

Known aircraft include systems that route bleed air through air conditioning systems to cool sub-systems within the aircraft, as well as internal chambers, such as the cockpit and the cabin. However, utilizing bleed air in relation to air conditioning within an aircraft decreases engine efficiency and aircraft range because energy is expended compressing the air, which is subsequently decompressed and re-cooled when used for air conditioning.

Air cycle machines have been used to provide air conditioning for various commercial and military aircraft. A typical air cycle machine utilizes high temperature, high pressure bleed air extracted from the compressor of a main engine, for example. As noted, however, extraction of bleed air expends energy, which is generated through fuel consumption. In short, a portion of the fuel is used to extract the bleed air, which, in turn, reduces the operating range of an aircraft. Further, aircraft range is typically further reduced because a typical air cycle machine has a low coefficient of performance (COP), which may be further reduced as the speed of the aircraft increases.

SUMMARY OF THE DISCLOSURE

A need exists for a system and method of efficiently and conditioning an internal chamber and/or components of an aircraft.

With that need in mind, certain embodiments of the present disclosure provide a thermal management system that is configured to cool portions of a vehicle. The thermal management system may include at least one vapor compression system (VCS) that is configured to cool the portions of the vehicle. The VCS circulates a fluid therethrough to cool the portions of the vehicle through heat exchange. At least one reverse air cycle machine (RACM) couples to the VCS through a first heat exchanger. The RACM is configured to receive ram air. A turbine of the RACM expands the ram air. Heat from the fluid circulating through the at least one VCS is transferred to the expanded ram air through the first heat exchanger. The thermal management system may refrain from utilizing bleed air from an engine of the vehicle.

The RACM may include at least one turbine. The ram air may at least partially power the turbine. The RACM may include at least one compressor that compresses the ram air after the heat from the fluid is transferred to the ram air. The turbine may at least partially power the compressor. The ram air is exhausted from the vehicle after the compressor compresses the ram air.

The thermal management system may also include a second heat exchanger that couples the VCS to a ram air conduit that connects to a ram air inlet. Heat from the fluid circulating through the VCS is also transferred to the ram air flowing through the ram air conduit through the second heat exchanger.

The thermal management system may also include a third heat exchanger that couples the VCS to a fuel line that connects a fuel tank to an engine of the vehicle. Heat from the fluid circulating through the VCS is also transferred to fuel flowing through the fuel line through the third heat exchanger.

In at least one embodiment, at least two parallel vapor compressors may be used. In at least one embodiment, at least two parallel RACMs may be used.

The RACM may include one or more first valves configured to control a flow of ram air through a heat exchange circuit that includes the first exchanger. The VCS may include one or more second valves configured to control a flow of the fluid through the VCS. The thermal management system may also include a control unit operatively coupled to the first valve(s) and the second valve(s). The control unit selectively controls the one or first valve(s) and the second valve(s).

Certain embodiments of the present disclosure provide a thermal management method of cooling portions of a vehicle. The thermal management method may include cooling the portions of the vehicle with at least one vapor compression system (VCS). The cooling operation may include circulating a fluid through the VCS to cool the portions of the vehicle through heat exchange. The method may also include receiving ram air with at least one reverse air cycle machine (RACM) that couples to the VCS through a first heat exchanger, expanding and cooling the ram air with the RACM, and transferring heat from the fluid circulating through the VCS to the ram air that is expanded through the first heat exchanger.

Certain embodiments of the present disclosure provide an aircraft that may include a fuselage defining one or more internal compartments, one or more electronic components, wings extending from the fuselage, an empennage extending from the fuselage, one or more engines, a fuel line that connects a fuel tank to an engine of the vehicle, and a thermal management system that cools portions of the aircraft without using bleed air from the one or more engines.

Certain embodiments of the present disclosure provide a thermal management system that is configured to cool portions of a vehicle. The thermal management system includes at least one vapor compression system (VCS) that is configured to cool the portions of the vehicle. The VCS circulates a fluid therethrough to cool the portions of the vehicle through heat exchange. At least one reverse air cycle machine (RACM) couples to the VCS through a first heat exchanger. The RACM includes a first turbine, a second turbine, a first compressor, and a second compressor. The RACM is configured to receive and expand ram air, such as through the turbines. Heat from the fluid circulating through the VCS is transferred to the ram air that is expanded through the first heat exchanger.

In at least one embodiment, the RACM also includes a branching conduit in fluid communication with an inlet conduit and the first and second turbines. The ram air is split into a first ram air stream and a second ram air stream within the branching conduit. A first turbine conduit is in fluid communication with the first turbine. The first ram air stream passes into the first turbine conduit. A second turbine conduit is in fluid communication with the second turbine. The second ram air stream passes into the second turbine conduit. A merging conduit is in fluid communication with the first and second turbine conduits and an exchange inlet conduit. The first and second ram air streams are merged within the merging conduit.

In at least one embodiment, the RACM also includes a branching conduit in fluid communication with an exchange outlet conduit and the first and second compressors. The ram air is split into a first ram air stream and a second ram air stream within the branching conduit. A first compressor conduit is in fluid communication with the first compressor. The first ram air stream passes into the first compressor conduit. A second compressor conduit is in fluid communication with the second compressor. The second ram air stream passes into the second compressor conduit. A merging conduit is in fluid communication with the first and second compressor conduits and an outlet conduit. The first and second ram air streams are merged within the merging conduit.

The first turbine, the second turbine, the first compressor, and the second compressor may be coupled to a common shaft. The RACM may include a motor coupled to one or more of the first turbine, the second turbine, the first compressor, or the second compressor. The first and second turbines may be configured to be at least partially powered by the ram air. The first and second compressors may be configured to be at least partially powered by the turbines.

Certain embodiments of the present disclosure provide a thermal management method of cooling portions of a vehicle. The thermal management method includes cooling the portions of the vehicle with at least one vapor compression system (VCS). The cooling operation includes circulating a fluid through the VCS to cool the portions of the vehicle through heat exchange. The method also includes receiving ram air with at least one reverse air cycle machine (RACM) that couples to the VCS through a first heat exchanger. The RACM includes a first turbine, a second turbine, a first compressor, and a second compressor. The method also includes expanding the ram air with the RACM, and transferring heat from the fluid circulating through the VCS to the expanded ram air via the first heat exchanger.

Certain embodiments of the present disclosure provide a reverse air cycle machine (RACM) that includes a first turbine, a second turbine, a first compressor, and a second compressor. The RACM may also include a first branching conduit in fluid communication with the first and second turbines (wherein the first branching conduit is configured to split an air stream into a first air stream and a second air stream), a first turbine conduit in fluid communication with the first turbine (wherein the first turbine conduit is configured to receive the first air stream), a second turbine conduit in fluid communication with the second turbine (wherein the second turbine conduit is configured to receive the second air stream), a first merging conduit in fluid communication with the first and second turbine conduits (wherein the merging conduit is configured to merge the first and second ram air streams), a second branching conduit in fluid communication with the first and second compressors (wherein the branching conduit is configured to split an air stream into a first air stream and a second air stream), a first compressor conduit in fluid communication with the first compressor (wherein the first compressor conduit is configured to receive the first air stream), a second compressor conduit in fluid communication with the second compressor (wherein the second compressor conduit is configured to receive the second air stream), and/or a second merging conduit in fluid communication with the first and second compressor conduits (wherein the first and second air streams are merged within the merging conduit).

DETAILED DESCRIPTION OF THE DISCLOSURE

Figure 1:
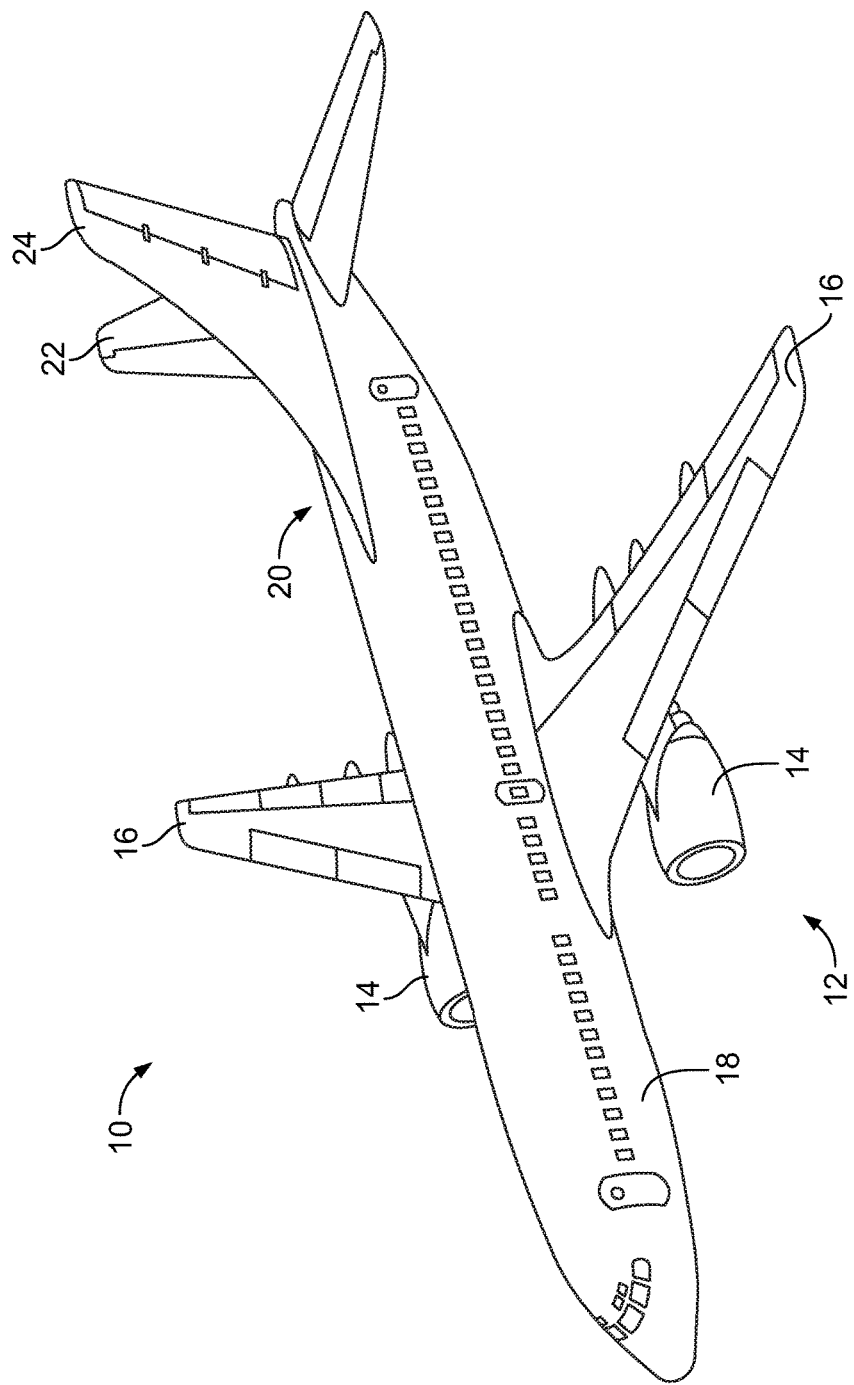
FIG. 1 illustrates a perspective top view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide systems and methods of efficiently cooling aircraft systems (for example, avionics systems), internal chambers, and the like. As such, embodiments of the present disclosure increase aircraft range (such as by consuming less fuel than known systems and methods). It has been found that embodiments of the present disclosure increase aircraft range, as compared to aircraft that utilize conventional bleed air thermal management systems, by a factor of four or more.

Certain embodiments of the present disclosure provide a thermal management system for an aircraft. The thermal management system may be used to cool aircraft systems and internal chambers, such as a cabin and cockpit. The thermal management system may include a reverse air cycle machine (RACM) coupled to a vapor cycle system (VCS). Heat energy is transferred between fluid flowing through the VCS and airflow from the RACM.

In at least one embodiment, ram air is routed to the RACM. The ram air may power a compressor of the RACM, such as by turning a turbine of the RACM. The ram air flowing through the turbine is cooled by expansion. The cooled ram air is then passed through a heat exchanger that couples the VCS to the RACM, where the cooled ram air absorbs heat energy from fluid flowing through the VCS. After passing through the heat exchanger, the ram air is routed back to a compressor of the RACM, and then expelled from the aircraft.

Certain embodiments of the present disclosure provide a thermal management system that is used to cool aircraft systems and compartments. The thermal management system may include a ram air inlet, and a first conduit that delivers ram air from the inlet to a turbine of a RACM, which may be powered, at least in part, by ram air flowing through the turbine, and may power, at least in part, a compressor. A second conduit delivers the ram air, which has been cooled via expansion, from the turbine of the RACM to a heat exchanger coupled with a two stage VCS. A third conduit delivers the ram air from the heat exchanger to a compressor of the RACM. Ram air from the compressor of the RACM is expelled from the aircraft through an outlet. One or more valves may be used to control the volume of air flow through the heat exchanger and through the system.

The thermal management system may be bleedless, in that it does not utilize bleed air from an engine. The thermal management system combines a Vapor Compression System (VCS) with a Reverse Air Cycle Machine (RACM). The VCS conditions aircraft heat loads. A subcooler may be employed in the VCS to further improve cycle performance. Two stages of refrigeration compression may be employed to increase refrigerant condensing temperature. The RACM may be used to generate a cold heat sink for the VCS by expanding ram air. After absorbing waste heat, the expanded ram air may be compressed and dumped overboard. By lowering the temperature of the ram air through expansion, the RACM reduces the amount of ram air used, which reduces ram drag and improves vehicle performance. The thermal management system may also utilize fuel and unexpanded ram air as additional heat sinks. Pressurized ram air may be used to drive the RACM, at least in part. In at least one embodiment, the RACM may also include an electric motor that assists the RACM in expanding and compressing the ram air.

To maintain high efficiency, parallel vapor compression and/or multiple RACM units may be used. In addition to improving efficiency, parallel units reduce the size of thermal management system turbo machinery of the aircraft. In at least one other embodiment, the RACM may be a double flow RACM including multiple turbines and multiple compressors coupled to a common shaft.

Certain embodiments of the present disclosure provide a double flow reverse air cycle machine (RACM) that includes two or more turbines and two or more compressors coupled to a common shaft. It has been found that the double flow RACM performs at least as well as a single flow RACM, while having a reduced size in comparison to a single flow RACM. For example, it has been found that the double flow RACM is approximately 30% smaller than a single flow RACM. The reduced size of the double flow RACM occupies less space within the limited space of an aircraft. As such, the double flow RACM frees space on an aircraft that may be used for other purposes, such as cargo storage.

FIG. 1 illustrates a perspective top view of a vehicle, such as an aircraft 10 (or aircraft assembly), according to an embodiment of the present disclosure. The aircraft 10 may include a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

As explained below, the aircraft 10 may include a thermal management system that is used to cool various systems within the aircraft, as well as the internal cabin. The thermal management system may include at least one vapor compression system (VCS) coupled to at least one reverse air cycle machine (RACM). The RACM may be a single flow RACM, or a double flow RACM. In at least one embodiment, the double flow RACM includes two turbines and two compressors coupled to a common shaft. The double flow RACM may include a motor. In at least one other embodiment, the double flow RACM may not include a motor. Alternatively, instead of an aircraft, embodiments of the present disclosure may be used with various other vehicles, such as automobiles, buses, locomotives and train cars, watercraft, and the like.

Figure 2A:
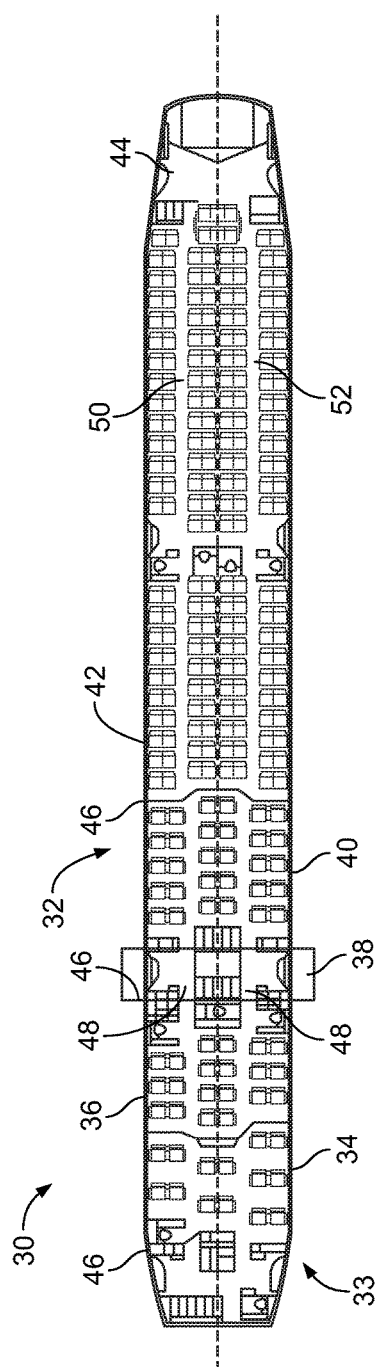
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34 (or first class suites, cabins, for example), a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
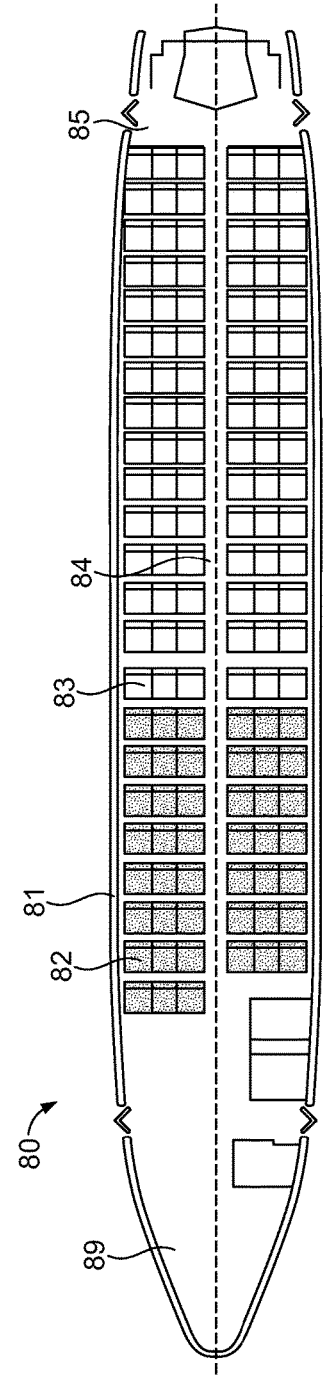
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a cockpit 89, a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
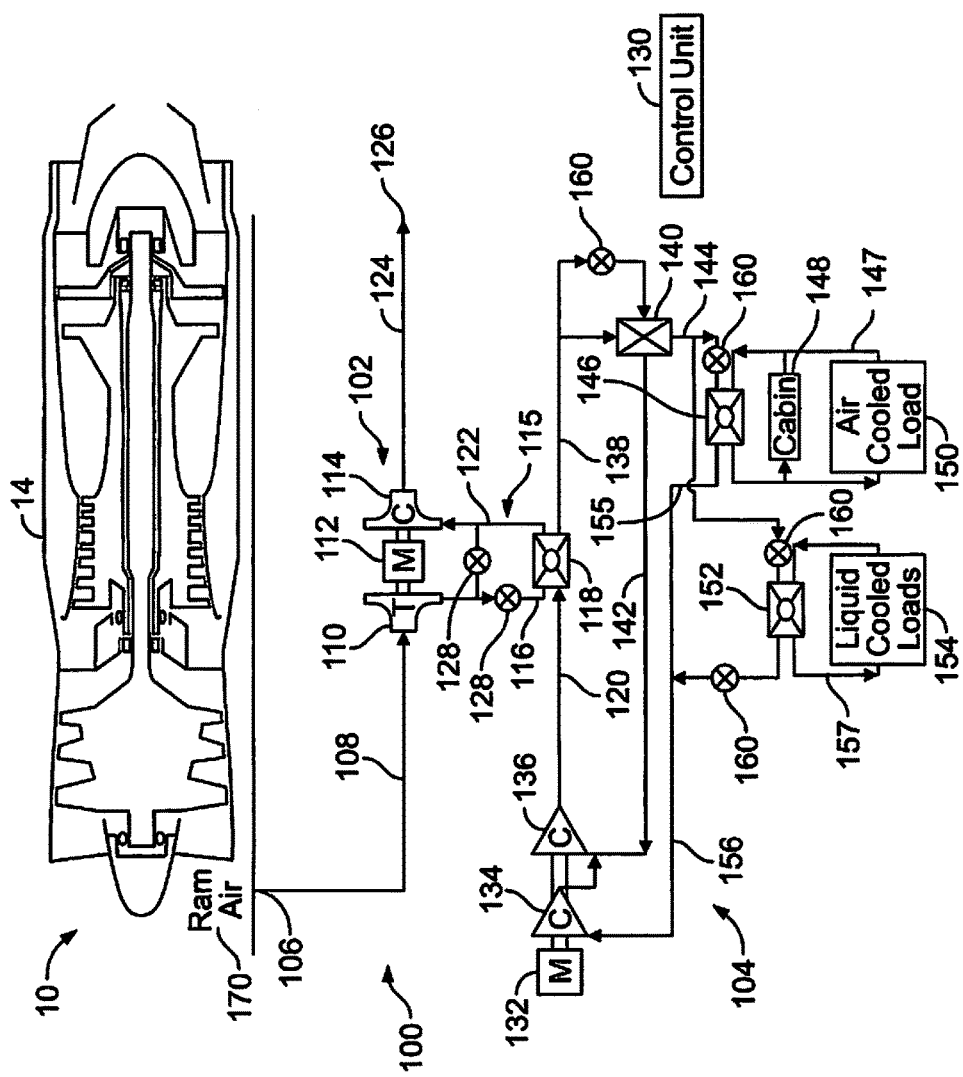
FIG. 3 illustrates a schematic view of a thermal management system of an aircraft, according to an embodiment of the present disclosure.

FIG. 3 illustrates a schematic view of a thermal management system 100 of the aircraft 10, according to an embodiment of the present disclosure. The thermal management system 100 may include a reverse air cycle machine (RACM) 102 coupled to a vapor compression system (VCS) 104.

A ram air inlet 106 is formed through a portion of the aircraft 10. For example, the ram air inlet 106 may be formed through a portion of the fuselage 18 (shown in FIG. 1), the wings 16 (shown in FIG. 1), and/or the like. Additional ram inlets 106 may be formed through the portion of the aircraft 10.

The ram air inlet 106 is coupled to the RACM 102 through an inlet conduit 108, such as a tube, pipe, plenum, or other such structure. The RACM 102 includes a turbine 110 coupled to a motor 112. The RACM 102 also includes a compressor 114. The RACM 102 may provide a refrigeration unit for an environmental control system (ECS), such as the thermal management system 100.

Figure 7:
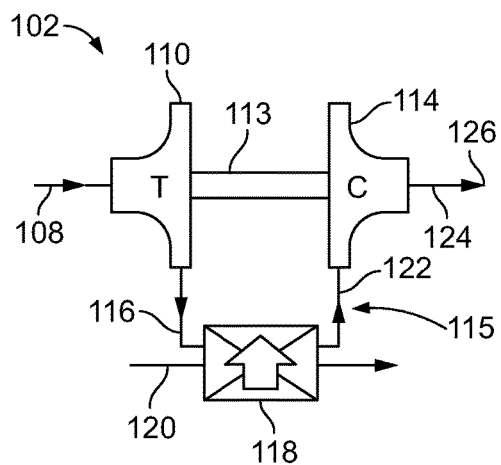
FIG. 7 illustrates a schematic view of a reverse air cycle machine, according to an embodiment of the present disclosure.
Figure 9:
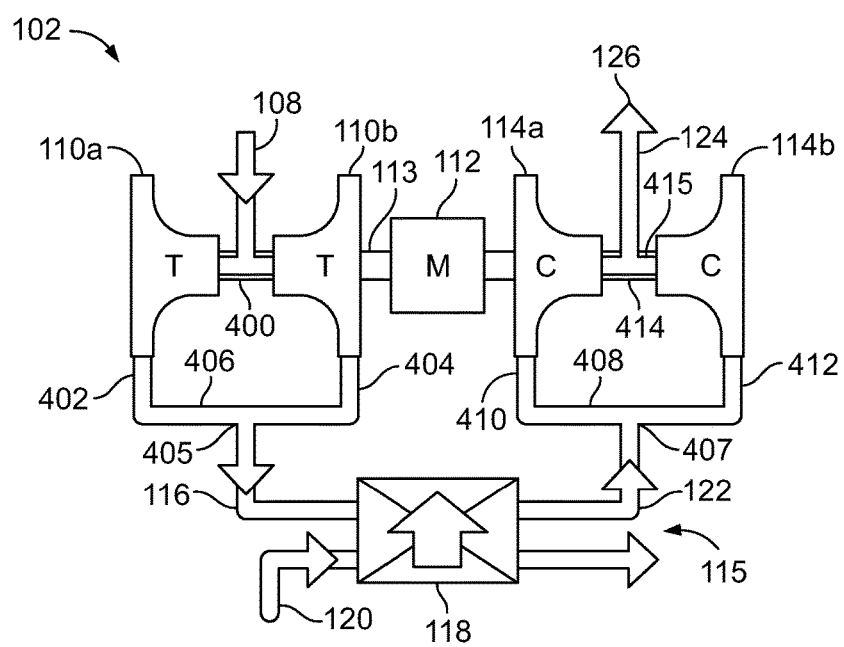
FIG. 9 illustrates a schematic view of a reverse air cycle machine, according to an embodiment of the present disclosure.

As shown in FIG. 3, the RACM 102 includes the turbine 110, the motor 112, and the compressor 114. The turbine 110 and the compressor 114 are coupled to a common shaft 113. The RACM 102 is a single flow RACM 102 in that a single stream of ram air flows through the turbine 110 and the compressor 112. In at least one other embodiment, the RACM 102 may not include the motor 112, such as shown in FIG. 7. In at least one other embodiment, the RACM 102 is a double flow RACM 102 having two turbines and two compressors coupled to a common shaft, such as shown in FIG. 9. The RACM 102 may be a double flow RACM in that ram air is separated into two streams.

The RACM 102 may include or otherwise be coupled to a heat transfer circuit 115. The heat transfer circuit 115 may include an exchange inlet conduit 116 that extends from the turbine 110 to an inlet of a heat exchanger 118, and an exchange inlet conduit 120 of the VCS 104. The heat exchanger 118 couples the RACM 102 to the VCS 104. An exchange outlet conduit 122 extends from an outlet of the heat exchanger 118 to the compressor 114 of the RACM 102. An outlet of the compressor 114 connects to an outlet conduit 124 that connects to an air outlet 126 formed through a portion of the aircraft 10, such as a portion of the fuselage 18 (shown in FIG. 1).

One or more valves 128 may be disposed within the heat transfer conduit 115. The valves 128 may be selectively operated and controlled by a remote control unit 130. The control unit 130 operates the valves 128 to control fluid flow through the heat transfer conduit 115.

The VCS 104 may be configured to provide vapor-compression refrigeration, in which a refrigerant undergoes phase changes to condition an internal cabin and/or systems of the aircraft 10. The VCS 104 circulates the refrigerant therethrough to cool portions of the aircraft 10 through heat exchange. The refrigerant provides a fluid that circulates through the VCS 104, through various phases (for example, liquid and vapor phases), in order to cool an internal cabin and/or components of the aircraft 10.

The VCS 104 may include a motor 132 coupled to compressors 134 and 136. The compressor 136 is coupled to the exchange inlet conduit 120 that passes through the heat exchanger 118. An exchange outlet conduit 138 extends from an outlet of the heat exchanger 118 to a heat exchanger 140. A return conduit 142 extends between the heat exchanger 140 and the compressor 136. A conditioning conduit 144 extends between the heat exchanger 140 and a heat exchanger 146 that couples to a heat transfer circuit 147 that is coupled to a cabin 148 and air cooled loads 150 (for example, one or more electronic systems of the aircraft 10 that are cooled through air circulation) within the aircraft 10. The conditioning conduit 144 may also couple to a heat exchanger 152 that couples to a heat transfer circuit 157 that couples to liquid cooled loads 154 (for example, one or more electronic systems of the aircraft 10 that are cooled through liquid circulation). Return conduits 155 and 156 couple outlets of the heat exchangers 146 and 152, respectively, to the compressor 134.

As shown, one or more valves 160 may be disposed within the various conduits of the VCS 104. The valves 160 may be selectively controlled by the control unit 130 to provide a desired amount of fluid (for example, refrigerant or other such coolant) flow through the VCS 104.

In operation, ram air 170 passes into the ram air inlet 106 and into the turbine 110 through the inlet conduit 108. Ram air is airflow created by movement of the aircraft 10, as opposed to bleed air, which is generated by the engine 14. That is, as the aircraft moves, air flow is created in relation to the movement, and is forced into the inlet conduit 108. The thermal management system 100 utilizes the ram air 170, but not bleed air, in order to cool the fluid within the VCS 104, which is, in turn, used to cool internal compartments and/or components of the aircraft 10.

The ram air 170 passes into the turbine 110 and powers the turbine 110. That is, the flow of the ram air 170 through the turbine 110 causes the turbine 110 to move. The motor 112 may be used to assist movement of the turbine 110. As the ram air 170 passes through the turbine 110, the ram air 170 expands and cools. The expanded, cooled ram air 170 then passes into the heat exchanger 118.

As the ram air 170 passes through the heat exchanger 118, heat energy is transferred from the fluid within the VCS 104 passing through the exchange inlet conduit 120 to the ram air 170 through the heat exchanger 118. As such, the RACM 102 provides a heat sink in which the ram air 170 absorbs heat from the fluid flowing through the VCS 104. The ram air 170 then passes into the compressor 114 of the RACM 102, where it is compressed, and then is exhausted out of the aircraft 10 through the air outlet 126.

The fluid flowing through the VCS 104 is cooled through energy exchange with the ram air 170. The cooled fluid within the VCS 104 is used to pick up heat from the cabin 148, the air cooled load 150, and the liquid cooled loads 154 through energy exchange, thereby cooling the cabin 148, the air cooled load 150, and the liquid cooled loads.

The control unit 130 may operate to selectively control fluid flow through the thermal management system 100 through the valves 128 and 160. For example, the control unit 130 may selectively open and close the valves 128 and 160 to control a temperature of the fluids (whether gas, vapor, or liquid) through the various conduits, in order to control temperatures of the cabin 148, the air cooled load 150, and the liquid cooled loads 154.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 130 may be or include one or more processors that are configured to control operation of the thermal management system 100.

The control unit 130 is configured to execute a set of instructions that are stored in one or more storage elements (such as one or more memories), in order to process data. For example, the control unit 130 may include or be coupled to one or more memories. The storage elements may also store data or other information as desired or needed. The storage elements may be in the form of an information source or a physical memory element within a processing machine.

The set of instructions may include various commands that instruct the control unit 130 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 130. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 130 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
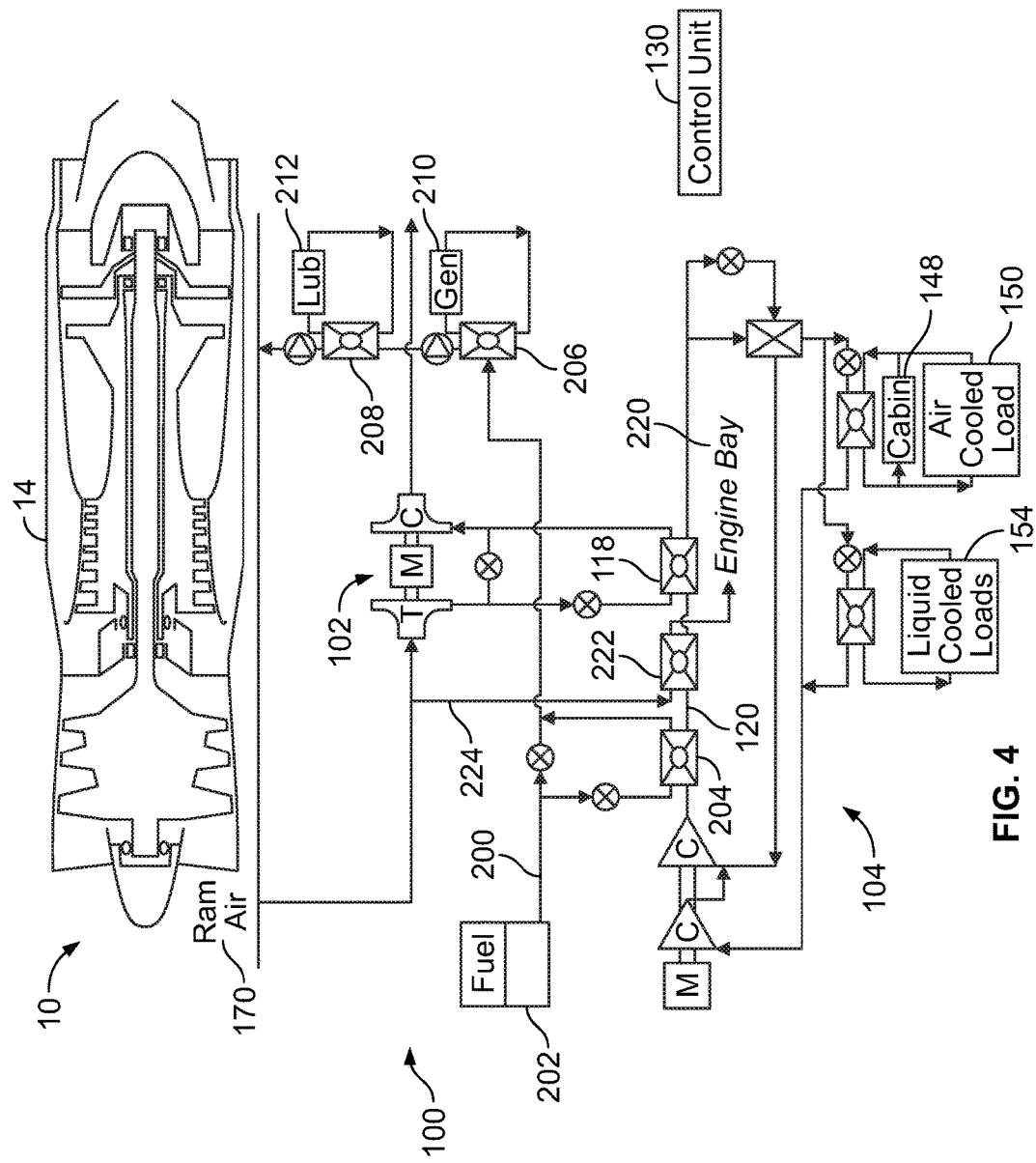
FIG. 4 illustrates a schematic view of a thermal management system, according to an embodiment of the present disclosure.

FIG. 4 illustrates a schematic view of the thermal management system 100, according to an embodiment of the present disclosure. The thermal management system 100 is similar to the embodiment shown in FIG. 3. In addition to the expanded ram air flowing through the RACM 102 being a heat sink in relation to the fluid flowing through the VCS 104, a fuel line 200 also provides an additional heat sink. The fuel line 200 provides a fuel delivery conduit between a fuel tank 202 and the engine 14. A heat exchanger 204 couples the fuel line 200 to the exchange inlet conduit 120 of the VCS 104. As such, the heat exchanger 204 transfers heat energy from the fluid within the exchange inlet conduit 120 to the fuel within the fuel line 200, thereby increasing the temperature of the fuel, and decreasing the temperature of the fluid within the exchange inlet conduit 120.

The fuel line 200 may then pass through heat exchangers 206 and 208 of an engine generator 210 and a lubrication system 212. Heat energy is transferred from the generator 210 and the lubrication system 212 to fuel within the fuel line 200 by way of the heat exchangers 206 and 208, thereby increasing the temperature of the fuel, and decreasing the temperature of the generator 210 and the lubrication system 212. The fuel is then delivered to the engine through the fuel line 200.

Alternatively, the fuel line 200 may not be coupled to the generator 210 and the lubrication system 212 through the heat exchangers 206 and 208. Instead, fuel within the fuel line 200 may receive heat energy from the VCS 104 by way of the heat exchanger 204, and then pass directly to the engine 14.

Additionally, ram air 170 (which is not expanded and cooled) that is used to ventilate an engine bay 220 may be used as an additional heat sink. A first portion of the ram air 170 may be delivered to the RACM 102, as described above. A second portion of the ram air 170 may be delivered to a heat exchanger 222 coupled to the exchange inlet conduit 120 by way of a transfer conduit 224. The ram air 170 passing through the heat exchanger 222 receives heat energy from the fluid (for example, refrigerant or other coolant) flowing through the heat exchanger 222. As such, the temperature of the ram air 170 passing through the heat exchanger 222 increases, which reduces the temperature of the fluid flowing through the exchange inlet conduit 120. The ram air 170 then passes to the engine bay 220.

Accordingly, the thermal management system 100 provides three heat sinks. First, the RACM 102 provides a heat sink that receives heat energy from the VCS 104 through the heat exchanger 118. Second, the fuel line 200 provides a heat sink that receives heat energy from the VCS 104 through the heat exchanger 204. Third, the ram air 170 provides a heat sink that receives heat energy from the VCS 104 through the heat exchanger 222. All three heat sinks absorb heat energy from the VCS 104, thereby cooling the fluid flowing through the VCS 104, which thereby efficiently cools the cabin 148 and various components of the aircraft 10, such as those that are cooled through air circulation or ventilation and those that are cooled through liquid circulation.

Figure 5:
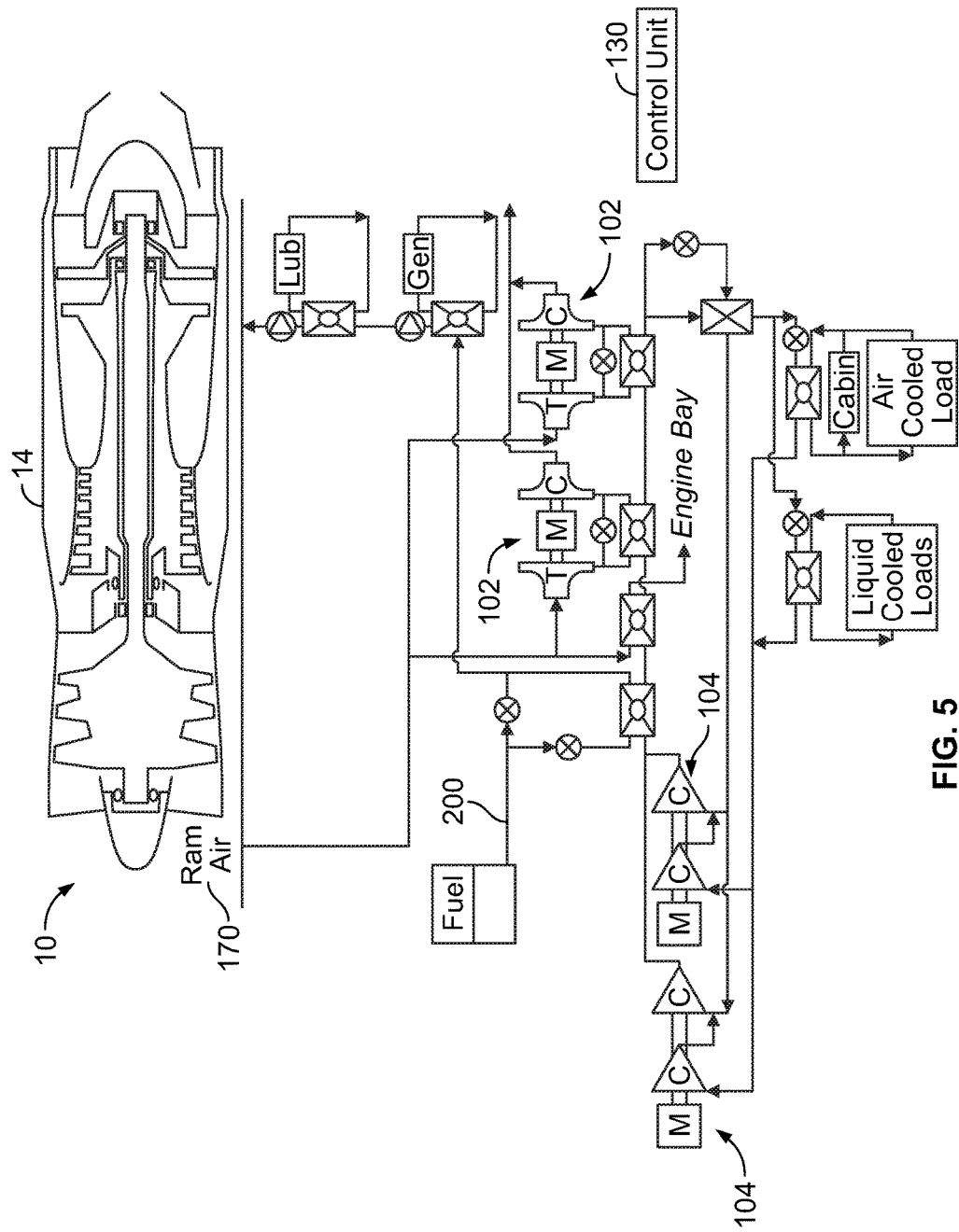
FIG. 5 illustrates a schematic view of a thermal management system, according to an embodiment of the present disclosure.

FIG. 5 illustrates a schematic view of the thermal management system 100, according to an embodiment of the present disclosure. The thermal management system 100 shown in FIG. 5 is similar to the thermal management system described with respect to FIG. 4, except that the thermal management system 100 may include two RACMs 102 and two VCS units 104. The RACMs 102 are connected in parallel, while the VCS 104 are also connected in parallel. The multiple RACMs 102 and VCS 104 provide increased energy exchange with portions of the aircraft 10. The multiple RACMs 102 and VCS 104 provide increased and efficient conditioning of the portions of the aircraft 10 (such as the cabin and liquid and air cooled components of the aircraft 10) over a wide cooling load range. For example, the additional RACM 102 and the additional VCS 104 provide increased cooling capacity for the aircraft 10.

Alternatively, the thermal management system 100 may include more or less RACMs 102 and VCS 104 than shown. For example, the thermal management system may include three or more RACMs 102 and three or more VCS 104. In at least one other embodiment, the thermal management system 100 may include two or more RACMs 102 and one VCS 104. In at least one other embodiment, the thermal management system 100 may include two or more VCS units 104 and one RACM 102.

Figure 6:
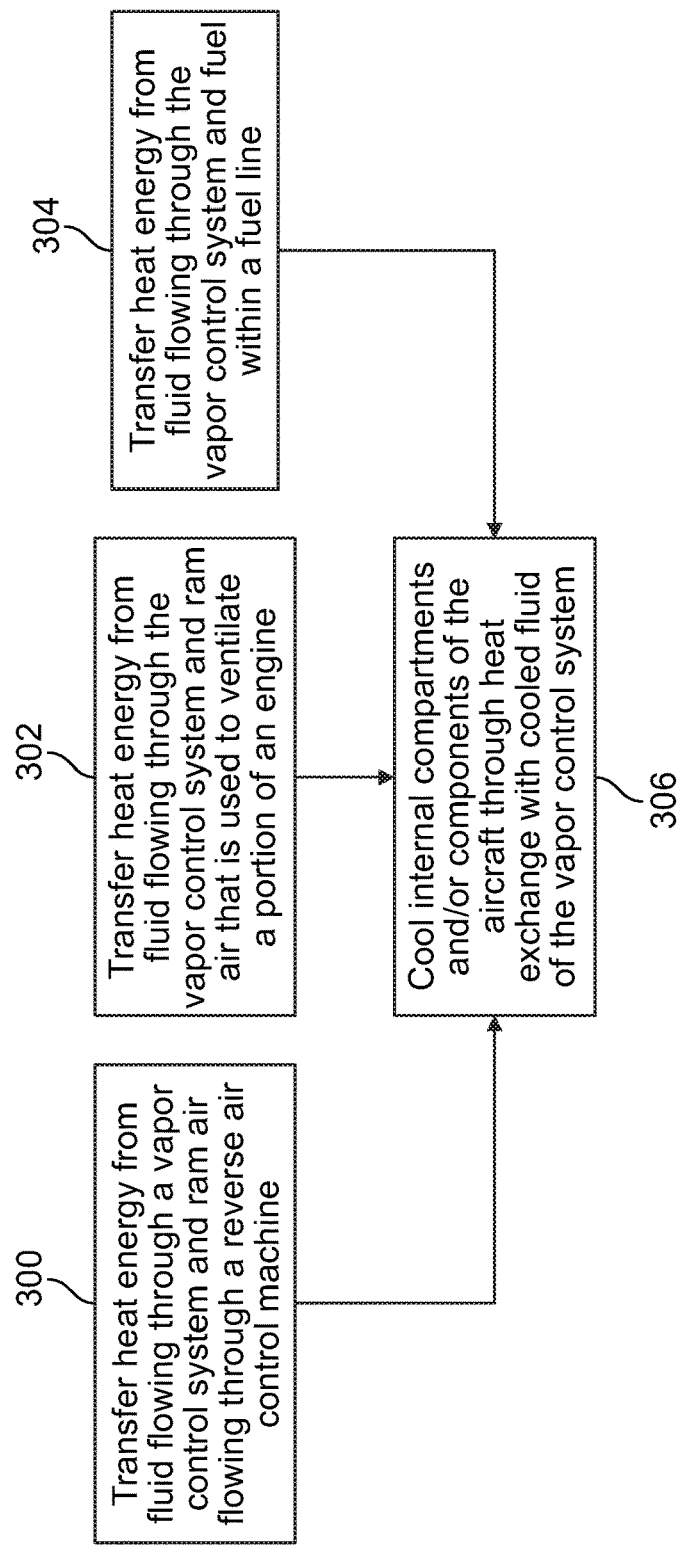
FIG. 6 illustrates a flow chart of a method of conditioning portions of a vehicle, according to an embodiment of the present disclosure.

FIG. 6 illustrates a flow chart of a method of conditioning portions of a vehicle, according to an embodiment of the present disclosure. The method begins at 300, in which heat energy is transferred from fluid flowing through a VCS and ram air that flows through a RACM. At 302, heat energy is transferred from fluid flowing the VCS and ram air that is used to ventilate a portion of an engine bay of the vehicle. At 304, heat energy is transferred from fluid flowing through the VCS and fuel within a fuel line that powers the engine. 300, 302, and 304 may occur in series or in parallel. The ram air that flows through the RACM, the ram air that is used to ventilate the engine bay, and the fuel within the fuel line each provide a separate and distinct heat sink that absorbs heat energy from the fluid within the VCS, thereby reducing the temperature of the fluid within the VCS, which may then absorb an increased amount of heat energy from various compartments and/or components of the aircraft through heat exchange. At 306, the internal compartments and/or components of the aircraft are cooled through heat exchange with the fluid of the VCS that has been cooled through the various heat sinks.

Alternatively, the method may not include 302. Also, alternatively, the method may not include 304.

FIG. 7 illustrates a schematic view of the RACM 102, according to an embodiment of the present disclosure. As shown, the RACM 102 includes the turbine 110 and the compressor 114 coupled to the common shaft 113. The RACM 102 may not include a motor.

Referring to FIGS. 3 and 7, the ram air inlet 106 is coupled to the RACM 102 through the inlet conduit 108, such as a tube, pipe, plenum, or other such structure. The RACM 102 shown in FIG. 7 is a single flow RACM.

The RACM 102 includes or is otherwise coupled to the heat transfer circuit 115. The heat transfer circuit 115 includes the exchange inlet conduit 116 that extends from the turbine 110 to an inlet of the heat exchanger 118. The heat exchanger 118 couples the RACM 102 to the VCS 104. The exchange outlet conduit 122 extends from the outlet of the heat exchanger 118 to the compressor 114 of the RACM 102. The outlet of the compressor 114 connects to the outlet conduit 124 that connects to the air outlet 126 formed through a portion of the aircraft 10, such as a portion of the fuselage 18 (shown in FIG. 1).

Figure 8:
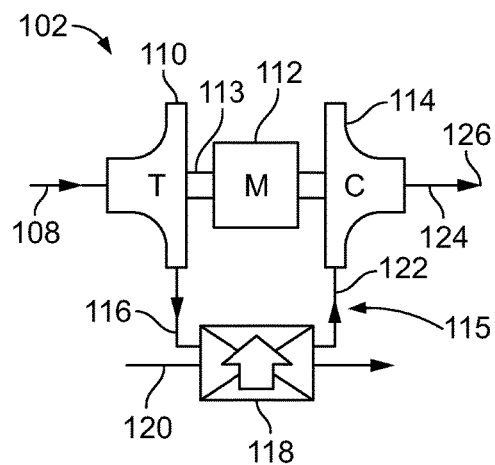
FIG. 8 illustrates a schematic view of a reverse air cycle machine, according to an embodiment of the present disclosure.

FIG. 8 illustrates a schematic view of the RACM 102, according to an embodiment of the present disclosure. As shown, the RACM 102 includes the turbine 110 and the compressor 114 coupled to the common shaft 113, as well as the motor 112. The RACM 102 may also include additional motors.

The motor 112 provides additional power to drive the compressor 114 if the power generated by the turbine 110 is lower than desired. For example, in one embodiment, it has been found that in order to provide 48 kW of cooling at an altitude of 4700 feet and a flight Mach number of 0.90, the diameter of the turbine 110 may be 9.5 inches, while the diameter of the compressor is 15.5 inches.

Referring to FIGS. 3 and 8, the ram air inlet 106 is coupled to the RACM 102 through the inlet conduit 108, such as a tube, pipe, plenum, or other such structure. The RACM 102 shown in FIG. 8 is a single flow RACM.

The RACM 102 includes or is otherwise coupled to the heat transfer circuit 115. The heat transfer circuit 115 includes the exchange inlet conduit 116 that extends from the turbine 110 to an inlet of the heat exchanger 118. The heat exchanger 118 couples the RACM 102 to the VCS 104. The exchange outlet conduit 122 extends from the outlet of the heat exchanger 118 to the compressor 114 of the RACM 114. The outlet of the compressor 114 connects to the outlet conduit 124 that connects to the air outlet 126 formed through a portion of the aircraft 10, such as a portion of the fuselage 18 (shown in FIG. 1).

FIG. 9 illustrates a schematic view of the RACM 102, according to an embodiment of the present disclosure. The RACM 102 is a double flow RACM. As shown, the RACM 102 includes turbines 110*a*, 110*b*, compressors 114*a*, 114*b*, and the motor 112. The turbines 110*a*, 110*b*, and the compressors 114*a*, 114*b* are coupled to the common shaft 113. The RACM 102 may also include additional motors. Alternatively, the RACM 102 may not include any motor. In at least one other embodiment, the RACM 102 may include three or more turbines and/or three or more compressors coupled to the common shaft 113.

Referring to FIGS. 3 and 9, the ram air inlet 106 is coupled to (for example, in fluid communication with) the RACM 102 through the inlet conduit 108, such as a tube, pipe, plenum, or other such structure. The inlet conduit 108 connects to a branching conduit 400 that connects to the turbines 110*a* and 110*b*. A first turbine conduit 402 connects to the turbine 110*a*, while a second turbine conduit 404 connects to the turbine 110*b*. Outlets of the first and second turbine conduits 402 and 404 connect to a merging conduit 406 that connects to the exchange inlet conduit 116.

In operation, a stream of air (such as ram air), passes into the inlet conduit 108 and is separated or otherwise split at the branching conduit 400, so that a first portion of the ram air passes through the first turbine 110*a*, while a second portion of the ram air passes through the second turbine 110*b*. After passing through the turbines 110*a* and 110*b*, the first and second portions of the ram air are passed into the first turbine conduit 402 and the second turbine conduit 404, respectively. The first and second portions of the ram air pass through the respective first and second turbine conduits 402 and 404 and merge back together in the merging conduit 406. The merged, expanded air stream passes out of an outlet 405 of the merging conduit 406 into the exchange inlet conduit 116 and into the heat exchanger 118, as described above with respect to FIG. 3.

The RACM 102 includes or is otherwise coupled to the heat transfer circuit 115. The heat transfer circuit 115 includes the exchange inlet conduit 116 that extends from the outlet 405 of the merging conduit 406 to an inlet of the heat exchanger 118. The heat exchanger 118 couples the RACM 102 to the VCS 104. The exchange outlet conduit 122 extends from the outlet of the heat exchanger 118 to an inlet 407 of a branching conduit 408 that connects to a first compressor conduit 410 and a second compressor conduit 412. The first compressor conduit 410 connects to the compressor 114a, while the second compressor conduit 412 connects to the compressor 114b. A merging conduit 414 connects to the first and second compressors 114a and 114. The merging conduit 414 has an outlet 415 that connects to the the outlet conduit 124.

In operation, the expanded ram air (that is, the ram that has passed through the turbines 110a, 110b, and the heat exchanger 118) passes through the exchange outlet conduit 122 and into the inlet 407 of the branching conduit 408, where the expanded ram air is split into two ram air streams. A portion of the ram air passes to the first compressor 114a, while another portion of the ram air passes to the second compressor 114b. The portions of the ram air pass through the compressors 114a and 114b and merge back together within the merging conduit 414. The merged, compressed ram air then passes out of outlet 415 of the merging conduit 414 into the outlet conduit 124 that connects to the air outlet 126 formed through a portion of the aircraft 10, such as a portion of the fuselage 18 (shown in FIG. 1).

As shown, the branching conduit 400 is in fluid communication with the inlet conduit 108 and the first and second turbines 110a and 110b. The ram air is split into a first ram air stream and a second ram air stream within the branching conduit 400. That is, a first portion of the ram air is passed to the first turbine 110a within the branching conduit 400, while a second portion of the ram air is passed to the second turbine 110b within the branching conduit 400.

The first turbine conduit 402 is in fluid communication with the first turbine 110a (and connects to the branching conduit 400 through the first turbine 110a). The first ram air stream passes into the first turbine conduit 402 after passing through the first turbine 110a.

The second turbine conduit 404 is in fluid communication with the second turbine 110(b) (and connects to the branching conduit 400 through the second turbine 110b). The second ram air stream passes into the second turbine conduit 404 after passing through the second turbine 110b.

The merging conduit 406 is in fluid communication with the first and second turbine conduits 402 and 404, respectively, and the exchange inlet conduit 116. The first and second ram air streams are merged back together within the merging conduit 406.

The branching conduit 408 is in fluid communication with the exchange outlet conduit 122 and the first and second compressors 114a and 114b. After passing through the heat exchanger 118, the ram air is split into a first ram air stream and a second ram air stream within the branching conduit 408.

The first compressor conduit 410 is in fluid communication with the first compressor 114a. The first ram air stream passes into the first compressor conduit 410.

The second compressor conduit 412 is in fluid communication with the second compressor 114b. The second ram air stream passes into the second compressor conduit 114b.

The merging conduit 414 is in fluid communication with the first and second compressor conduits 114a and 114b, and the outlet conduit 124. The first and second ram air streams are merged back together within the merging conduit 414, and exhausted out of the air outlet 126 via the outlet conduit 124.

The double flow RACM 102 shown in FIG. 9 provides a reduced-size RACM (in comparison to single flow RACMs). The double flow RACM 102 includes the two turbines 110a, 110b, and the two compressors 114a, 114b coupled to the common shaft 113. An air stream (such as ram air) entering the double flow RACM 102 is split into two streams (via the branching conduit 400), which feeds into the two separate turbines 110 and 110b. After the ram air is expanded by the turbines 110a and 110b, the ram air streams within the first and second turbine conduits 402 and 404 merge together within the merging conduit 405, pass into the exchange inlet conduit 116, and absorb waste heat while flowing through the heat exchanger 118. After passing through the heat exchanger 118, the ram air is again split into two air streams (via the branching conduit 408) and fed into the separate compressors 114a and 114 via the first and second compressor conduits 410 and 412, respectively. After the compressors 114 and 114b compress the air streams, the two air streams are merged together within the merging conduit 414, passed into the outlet conduit 124, and through and out the air outlet 126.

It has been found that the double flow RACM 102 shown in FIG. 9 reduces overall RACM size (compared to a single flow RACM) by approximately 30% or more. For example, in at least one embodiment, the diameter of each turbine 110a and 110b may be 7.3 inches (compared to a diameter of 9.5 inches for a single flow system), while the diameter of each compressor 114a and 114b may be 9.9 inches (compared to 13.5 inches for a single flow system). The double flow RACM 102 may be smaller in size than a single flow RACM, thereby freeing space on an aircraft (such as may be used for other purpose, such as cargo storage).

The double flow RACM 102 shown in FIG. 9 may be used with any of the embodiments of the present application. For example, the double flow RACM 102 shown in FIG. 9 may be used as the RACMs 102 shown in FIGS. 3, 4, and 5. The double flow RACM 102 may or may not include a motor. In at least one other embodiment, the double flow RACM 102 may include a plurality of motors. In at least one other embodiment, the RACM 102 may include three or more turbines and/or three or more compressors.

Referring to FIGS. 1-9, embodiments of the present disclosure provide thermal management systems that are configured to efficiently cool compartments and/or components of a vehicle (such as an aircraft) through transferring heat energy from fluid (such as coolant) within at least one VCS to ram air, such as may be used to ventilate an engine, and/or which has passed through at least one RACM. The thermal management systems may also transfer heat energy from the fluid within the one or more VCS to fuel within a fuel line of the vehicle. The thermal management systems do not utilize bleed air. As such, the thermal management systems do not expend fuel compressing bleed air, which thereby allows the fuel to be used by the engine(s), and therefore increase the fuel range of the vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A thermal management system that is configured to cool portions of a vehicle, the thermal management system comprising:
    at least one vapor compression system (VCS) that is configured to cool the portions of the vehicle, wherein the at least one VCS circulates a fluid therethrough to cool the portions of the vehicle through heat exchange; and
    at least one reverse air cycle machine (RACM) that couples to the at least one VCS through a first heat exchanger, wherein the at least one RACM comprises:
        a first turbine;
        a second turbine;
        a first compressor;
        a second compressor;
        a first branching conduit in fluid communication with an inlet conduit and the first and second turbines, wherein the ram air is split into a first ram air stream and a second ram air stream within the first branching conduit;
        a first turbine conduit in fluid communication with the first turbine, wherein the first ram air stream passes into the first turbine conduit;
        a second turbine conduit in fluid communication with the second turbine, wherein the second ram air stream passes into the second turbine conduit; and
        a merging conduit in fluid communication with the first and second turbine conduits and an exchange inlet conduit, wherein the first and second ram air streams are merged within the merging conduit,
    wherein the at least one RACM is configured to receive ram air, wherein the at least one RACM expands the ram air, and wherein heat from the fluid circulating through the at least one VCS is transferred to the ram air that is expanded through the first heat exchanger.

2. The thermal management system of claim 1, wherein the at least one RACM further comprises:
    a second branching conduit in fluid communication with an exchange outlet conduit and the first and second compressors, wherein the ram air is split into a third ram air stream and a fourth ram air stream within the second branching conduit;
    a first compressor conduit in fluid communication with the first compressor, wherein the third ram air stream passes into the first compressor conduit;
    a second compressor conduit in fluid communication with the second compressor, wherein the fourth ram air stream passes into the second compressor conduit; and
    a merging conduit in fluid communication with the first and second compressor conduits and an outlet conduit, wherein the third and fourth ram air streams are merged within the merging conduit.

3. The thermal management system of claim 1, wherein the first turbine, the second turbine, the first compressor, and the second compressor are coupled to a common shaft.

4. The thermal management system of claim 1, wherein the at least one RACM comprises a motor coupled to one or more of the first turbine, the second turbine, the first compressor, or the second compressor.

5. The thermal management system of claim 1, wherein the first and second turbines are configured to expand the ram air and at least partially drive the first and second compressors.

6. The thermal management system of claim 1, wherein the first and second compressors are configured to compress the ram air after the heat from the at least one VCS is transferred to the ram air, and wherein the ram air is exhausted from the vehicle after the first and second compressors compress the ram air.

7. The thermal management system of claim 1, wherein the thermal management system refrains from utilizing bleed air from an engine of the vehicle.

8. The thermal management system of claim 1, further comprising a second heat exchanger that couples the at least one VCS to a ram air conduit that connects to a ram air inlet, wherein heat from the fluid circulating through the at least one VCS is also transferred to the ram air flowing through the ram air conduit through the second heat exchanger.

9. The thermal management system of claim 1, further comprising a second heat exchanger that couples the at least one VCS to a fuel line that connects a fuel tank to an engine of the vehicle, wherein heat from the fluid circulating through the at least one VCS is also transferred to fuel flowing through the fuel line through the second heat exchanger.

10. The thermal management system of claim 1, wherein the at least one VCS comprises at least two parallel VCS units.

11. The thermal management system of claim 1, wherein the at least one RACM comprises at least two parallel RACMs.

12. The thermal management system of claim 1, wherein the at least RACM comprises one or more first valves configured to control a flow of ram air through a heat exchange circuit that includes the first exchanger, and wherein the at least one VCS comprises one or more second valves configured to control a flow of the fluid through the at least one VCS.

13. The thermal management system of claim 12, further comprising a control unit operatively coupled to the one or more first valves and the one or more second valves, wherein the control unit selectively controls the one or more first valves and the one or more second valves.

14. A thermal management method of cooling portions of a vehicle, the thermal management method comprising:
cooling the portions of the vehicle with at least one vapor compression system (VCS), wherein the cooling operation comprises circulating a fluid the at least one VCS to cool the portions of the vehicle through heat exchange; and
receiving ram air with at least one reverse air cycle machine (RACM) that couples to the at least one VCS through a first heat exchanger, wherein the at least one RACM comprises a first turbine, a second turbine, a first compressor, a second compressor, a first branching conduit in fluid communication with an inlet conduit and the first and second turbines, a first turbine conduit in fluid communication with the first turbine, a second turbine conduit in fluid communication with the second turbine, and a merging conduit in fluid communication with the first and second turbine conduits and an exchange inlet conduit, wherein the ram air is split into a first ram air stream and a second ram air stream within the first branching conduit, wherein the first ram air stream passes into the first turbine conduit, wherein the second ram air stream passes into the second turbine conduit, and wherein the first and second ram air streams are merged within the merging conduit;
expanding the ram air with the at least one RACM; and
transferring heat from the fluid circulating through the at least one VCS to the ram air that is expanded through the first heat exchanger.

15. A reverse air cycle machine (RACM) comprising:
a first turbine;
a second turbine;
a first compressor;
a second compressor;
a first branching conduit in fluid communication with the first and second turbines, wherein the first branching conduit is configured to split an air stream into a first air stream and a second air stream;
a first turbine conduit in fluid communication with the first turbine, wherein the first turbine conduit is configured to receive the first air stream;
a second turbine conduit in fluid communication with the second turbine, wherein the second turbine conduit is configured to receive the second air stream; and
a merging conduit in fluid communication with the first and second turbine conduits, wherein the merging conduit is configured to merge the first and second ram air streams.

16. The RACM of claim 15, further comprising:
a second branching conduit in fluid communication with the first and second compressors, wherein the second branching conduit is configured to split the air stream into a third air stream and a fourth air stream;
a first compressor conduit in fluid communication with the first compressor, wherein the first compressor conduit is configured to receive the third air stream;
a second compressor conduit in fluid communication with the second compressor, wherein the second compressor conduit is configured to receive the fourth air stream; and
a merging conduit in fluid communication with the first and second compressor conduits, wherein the third and fourth air streams are merged within the merging conduit.

17. The RACM of claim 15, wherein the first turbine, the second turbine, the first compressor, and the second compressor are coupled to a common shaft.

18. A thermal management system that is configured to cool portions of a vehicle, the thermal management system comprising:
at least one vapor compression system (VCS) that is configured to cool the portions of the vehicle, wherein the at least one VCS circulates a fluid therethrough to cool the portions of the vehicle through heat exchange; and
at least one reverse air cycle machine (RACM) that couples to the at least one VCS through a first heat exchanger, wherein the at least one RACM is configured to receive ram air, wherein the at least one RACM expands the ram air, wherein heat from the fluid circulating through the at least one VCS is transferred to the ram air that is expanded through the first heat exchanger, wherein the at least one RACM comprises:
a first turbine;
a second turbine;
a first compressor;
a second compressor, wherein the first turbine, the second turbine, the first compressor, and the second compressor are coupled to a common shaft;
a first branching conduit in fluid communication with an inlet conduit and the first and second turbines, wherein the ram air is split into a first ram air stream and a second ram air stream within the first branching conduit;
a first turbine conduit in fluid communication with the first turbine, wherein the first ram air stream passes into the first turbine conduit;
a second turbine conduit in fluid communication with the second turbine, wherein the second ram air stream passes into the second turbine conduit;
a first merging conduit in fluid communication with the first and second turbine conduits and an exchange inlet conduit, wherein the first and second ram air streams are merged within the first merging conduit;
a second branching conduit in fluid communication with an exchange outlet conduit and the first and second compressors, wherein the merged ram air is split into a third ram air stream and a fourth ram air stream within the second branching conduit;
a first compressor conduit in fluid communication with the first compressor, wherein the third ram air stream passes into the first compressor conduit;
a second compressor conduit in fluid communication with the second compressor, wherein the fourth ram air stream passes into the second compressor conduit; and
a merging conduit in fluid communication with the first and second compressor conduits and an outlet conduit, wherein the third and fourth ram air streams are merged within the merging conduit.

19. The thermal management method of claim 14, wherein the at least one RACM further comprises a second branching conduit in fluid communication with an exchange outlet conduit and the first and second compressors, a first compressor conduit in fluid communication with the first compressor, a second compressor conduit in fluid communication with the second compressor, and a merging conduit in fluid communication with the first and second compressor conduits and an outlet conduit, wherein the ram air is split into a third ram air stream and a fourth ram air stream within the second branching conduit, wherein the third ram air stream passes into the first compressor conduit, wherein the fourth ram air stream passes into the second compressor conduit, and wherein the third and fourth ram air streams are merged within the merging conduit.

* * * * *